(12) United States Patent
Verhaegen

(10) Patent No.: US 7,550,882 B2
(45) Date of Patent: Jun. 23, 2009

(54) COOLING FOR AN ELECTRIC MOTOR OR GENERATOR

(75) Inventor: Ken Gustaaf Helena Verhaegen, Aartselaar (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 428 days.

(21) Appl. No.: 10/577,862

(22) PCT Filed: Nov. 4, 2004

(86) PCT No.: PCT/BE2004/000158

§ 371 (c)(1), (2), (4) Date: Apr. 28, 2006

(87) PCT Pub. No.: WO2005/046024

PCT Pub. Date: May 19, 2005

(65) Prior Publication Data

US 2007/0035187 A1  Feb. 15, 2007

(30) Foreign Application Priority Data

Nov. 5, 2003  (BE) ................................. 2003/0596

(51) Int. Cl.
*H02K 9/00* (2006.01)

(52) U.S. Cl. .......................................... 310/58; 310/52

(58) Field of Classification Search ............. 310/52–54, 310/57–58, 254, 261
See application file for complete search history.

(56) References Cited

U.S. PATENT DOCUMENTS

| 3,963,950 | A | | 6/1976 | Watanabe et al. | |
|---|---|---|---|---|---|
| 4,709,180 | A | * | 11/1987 | Denk | ........................ 310/179 |
| 4,908,347 | A | * | 3/1990 | Denk | ........................ 505/166 |
| 5,304,883 | A | | 4/1994 | Denk | |
| 5,670,838 | A | * | 9/1997 | Everton | ...................... 310/254 |
| 6,111,334 | A | * | 8/2000 | Horski et al. | ................ 310/254 |
| 6,300,693 | B1 | * | 10/2001 | Poag et al. | .................... 310/54 |
| 2002/0117936 | A1 | | 8/2002 | Dressel | |

FOREIGN PATENT DOCUMENTS

| BE | 369 009 | 4/1930 |
|---|---|---|
| EP | 1 251 624 | 10/2002 |
| WO | WO 01/35513 | 5/2001 |

* cited by examiner

*Primary Examiner*—Thanh Lam
(74) *Attorney, Agent, or Firm*—Bacon & Thomas, PLLC

(57) ABSTRACT

Improved cooling arrangement for an electric motor or generator including a housing, what is called a "slotless" tubular stator lamination (4), a rotor (2) with permanent magnets and electric windings (25-26) which are provided between the stator lamination (4) and the rotor (2), wherein the cooling arrangement comprises a cooler (6) which is provided between the stator lamination (4) and the rotor (2) and in that the windings (25-26) are provided on this cooler (6).

16 Claims, 9 Drawing Sheets

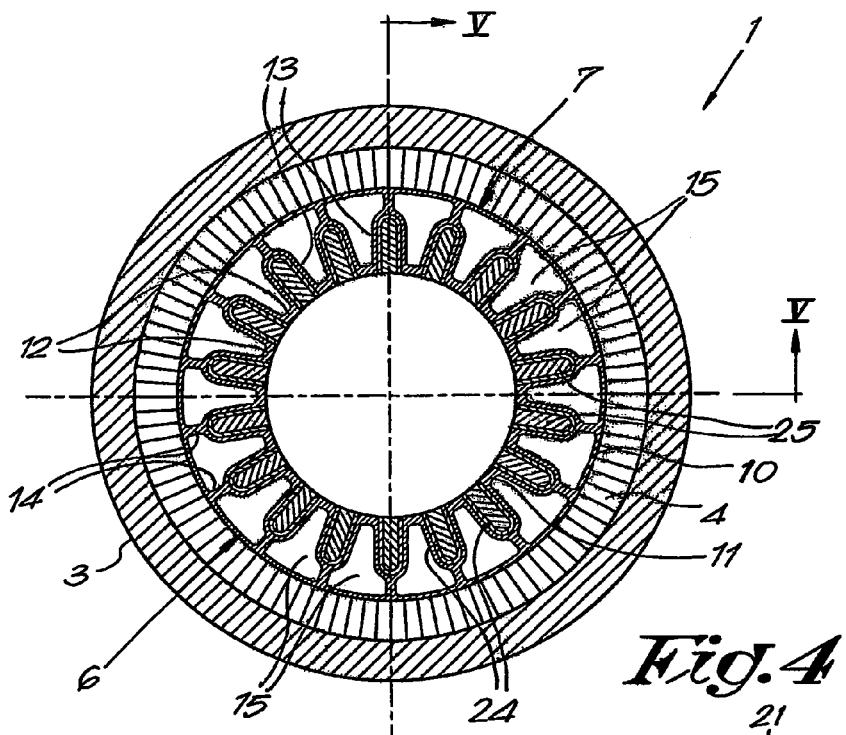
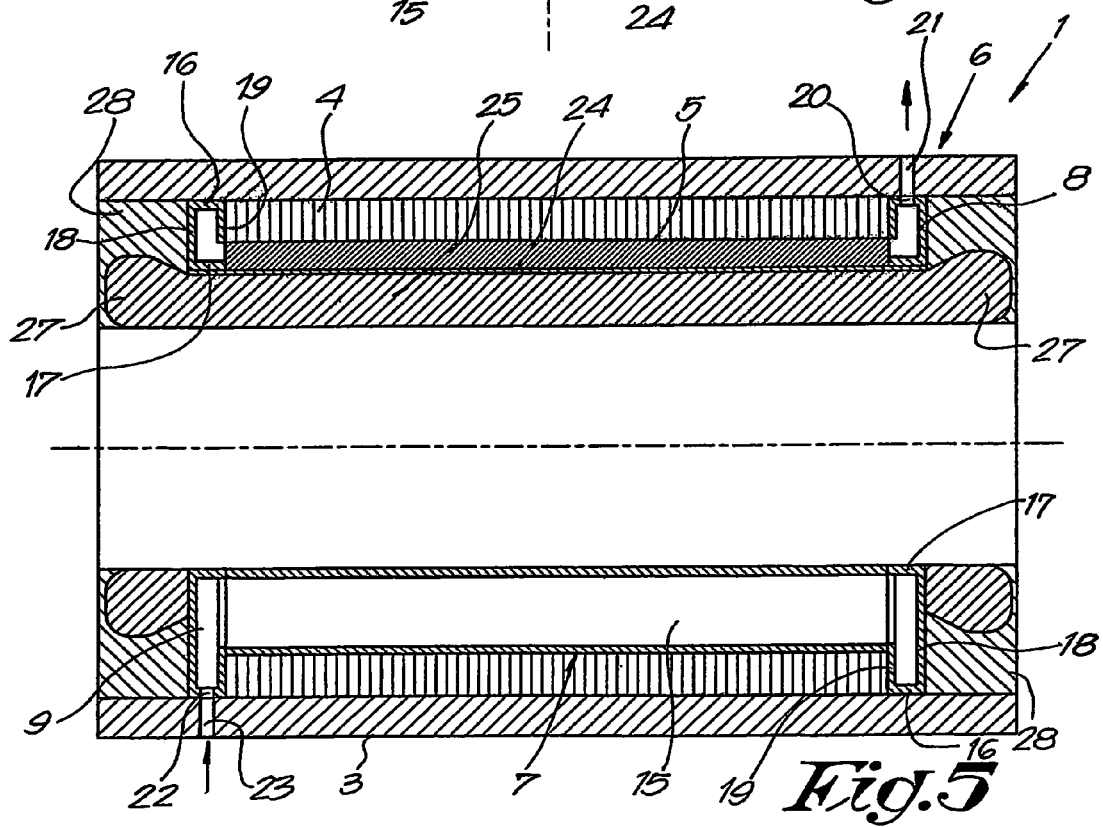

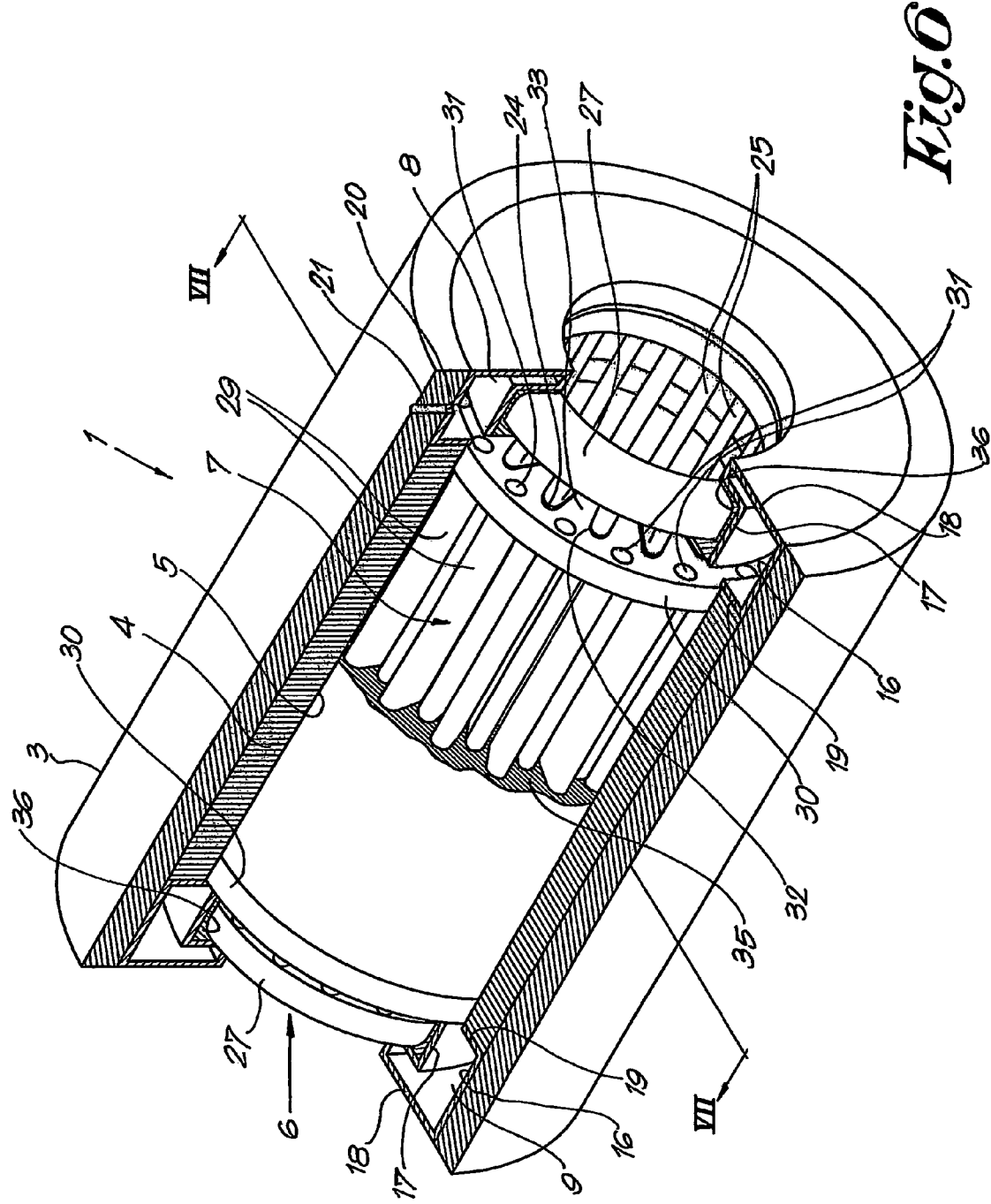

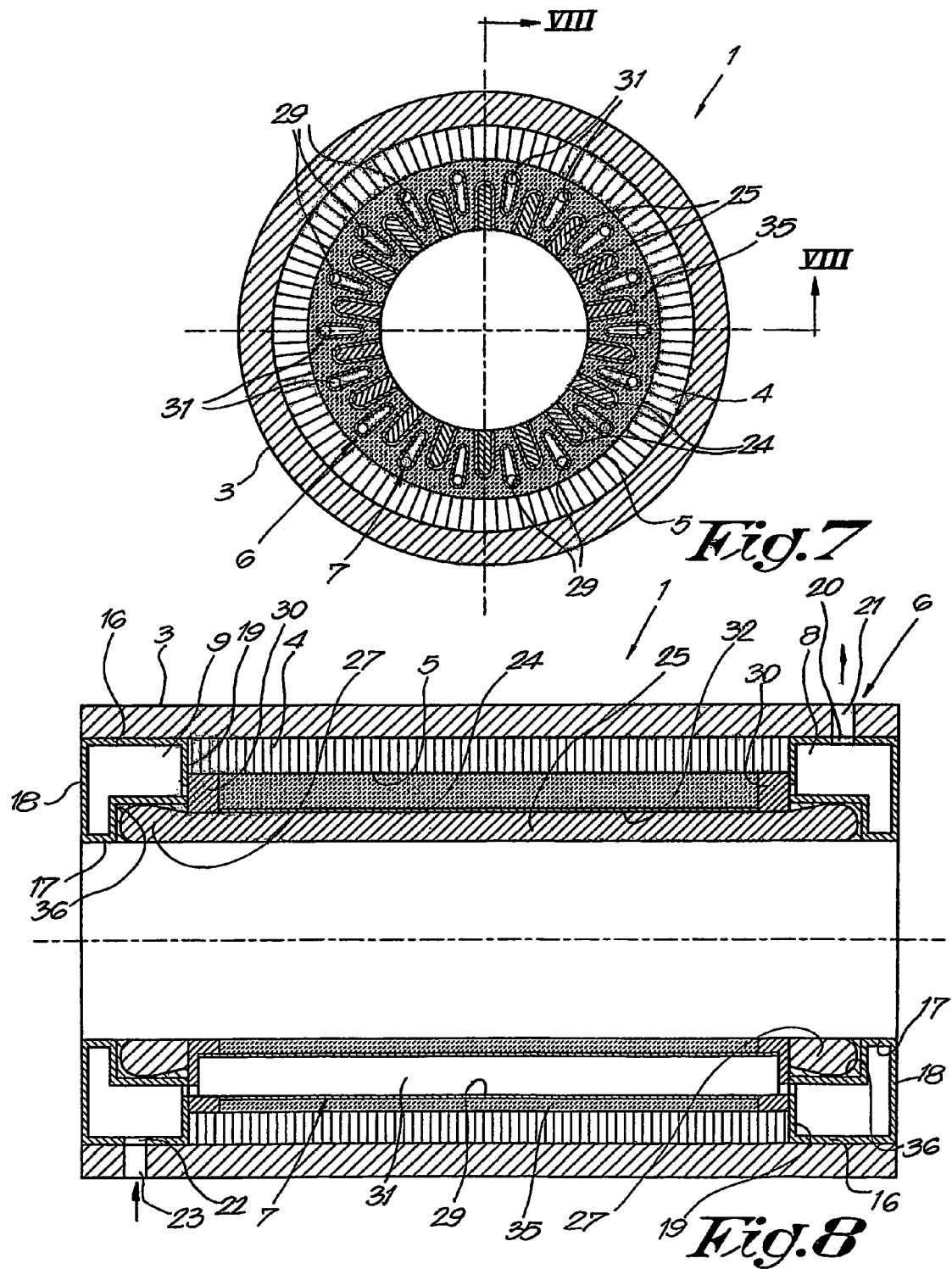

COOLING FOR AN ELECTRIC MOTOR OR GENERATOR

The present invention concerns a cooling for an electric motor or generator, more particularly what is called a "slotless" permanent magnet motor or generator.

It is known that such a "slotless" permanent magnet motor or generator is mainly composed of a housing and, in this housing, what is called a "slotless" tubular stator lamination with a smooth inner wall and electric windings wound in or around said tubular stator lamination on the one hand, and a rotor which is provided with permanent magnets on the other hand.

Such motors and generators which are equipped with a cooling formed of a cooling jacket provided on the outside of the stator through which cooling fluid flows is already known.

A disadvantage of such known stators is that the cooling at the rotor is often insufficient.

It is also known that "slotless" permanent magnet motors or generators are often provided with an air cooling, whereby air is blown over the winding heads of the stator by means of an external fan or by means of a screw or blades in one or other form, fixed on the magnet motor or generator cannot be realised in a simple manner, and the cost price of such a motor or generator is usually very high.

Another major disadvantage of the present known permanent magnet motors or generators, for example as in the case of the above-mentioned WO 01/35513 and U.S. Pat. No. 5,304,883, is that providing the windings is very laborious, time-consuming and expensive, since the "slotless" stator lamination in this case has a smooth inner wall without any teeth, around which the windings can be wound, as in the case of motors or generators with a conventional stator lamination.

The present invention aims to remedy the above-mentioned and other disadvantages.

To this end, the invention concerns cooling for an electric motor or generator consisting of a housing, what is called a "slotless" tubular stator lamination, a rotor with permanent magnets and electric windings provided between the stator lamination and the rotor, characterised in that the cooling comprises a cooler upon which said windings are provided and which is formed of a cooling element which is provided between the stator lamination and the rotor and which cooling element is provided with teeth directed radially towards the rotor which extend in the axial direction of the stator and in between which axially directed grooves are defined, such that the cooling element has an external shape of a conventional stator lamination with teeth for providing said windings.

An advantage of such a motor or generator according to the invention is that the cooling is applied in the immediate environment of the rotor and of the windings of the stator, as a result of which a very efficient cooling of the rotor with its magnets and the tube which holds the magnets on the rotor, as well as of the stator windings is obtained.

Another advantage is that such a motor or generator with an internal cooling is more compact than a known motor or generator with an external cooling jacket and a comparable capacity.

Another advantage is that, since the cooling is provided internally in the stator, such a stator can be used for closed motors or generators which are applied for example in dusty and damp environments or in environments with flammable or corrosive gasses.

Still another advantage of such a cooler is that the above-mentioned windings can be provided in a very simple manner in the above-mentioned grooves around the above-mentioned teeth, more particularly in the same manner as in the case of the conventional asynchronous or synchronous motors and generators which are provided with a stator lamination with teeth.

An advantage linked thereto is that such a stator can be manufactured at low cost and moreover can also be easily produced in series by applying the known full-automatic winding techniques applied with conventional motors and generators.

Another advantage is that such a cooler can also be manufactured via an automated process, for example by means of extrusion, die-casting, stereo lithography or the like.

In order to better explain the characteristics of the invention, the following preferred embodiments of a motor or generator with an improved cooling according to the invention are described as an example only, without being limitative in any way, with reference to the accompanying drawings, in which:

FIG. 1 schematically represents a stator of a motor or generator with an improved cooling according to the invention in perspective;

FIG. 4 represents a section according to line IV-IV in FIG. 1;

FIG. 5 represents a section according to line V-V in FIG. 4;

FIG. 6 represents a first variant according to FIG. 1;

FIG. 7 represents a section according to line VII-VII in FIG. 6;

FIG. 8 represents a section according to line VIII-VIII in FIG. 7;

Figure 1:
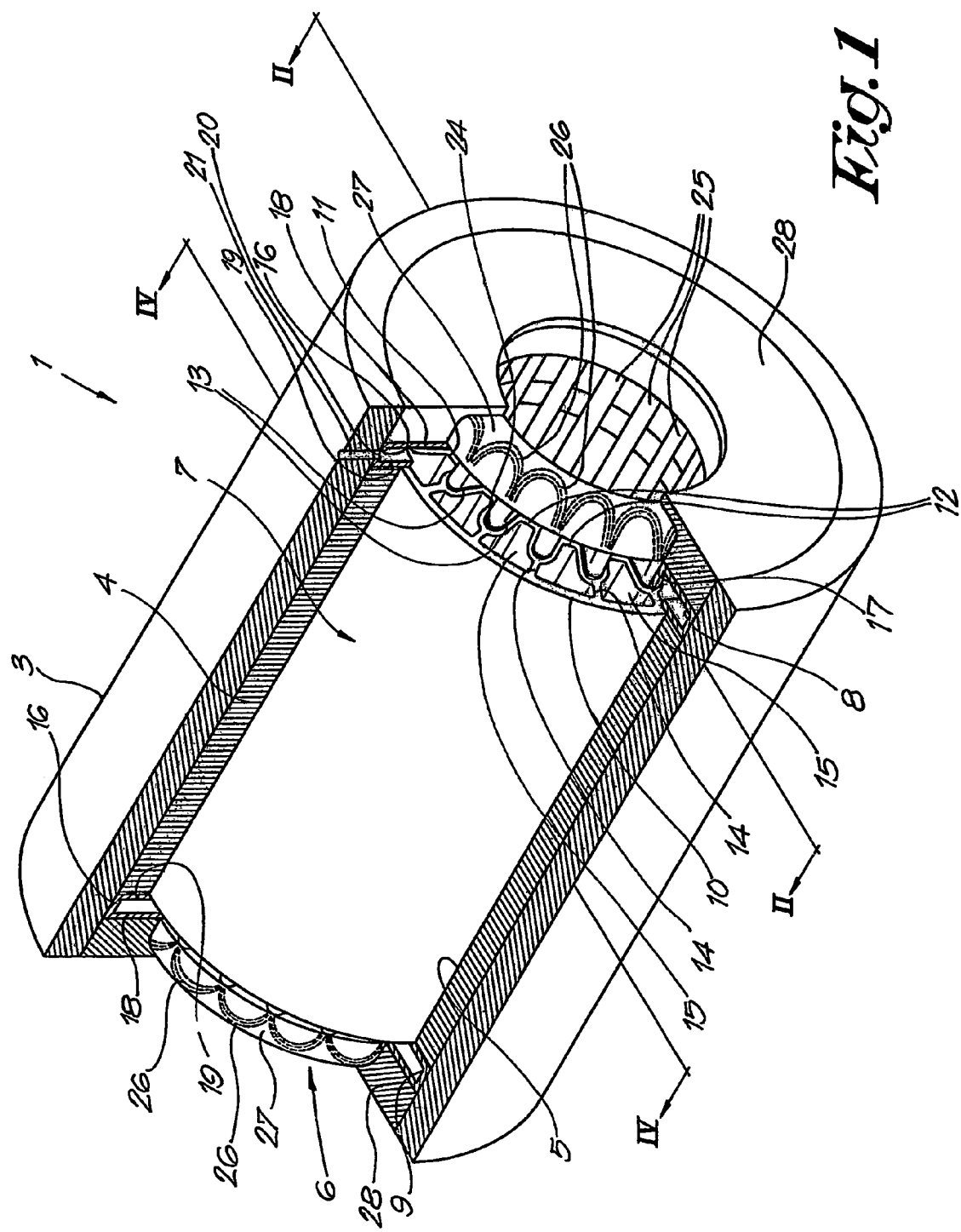
Figure 2:
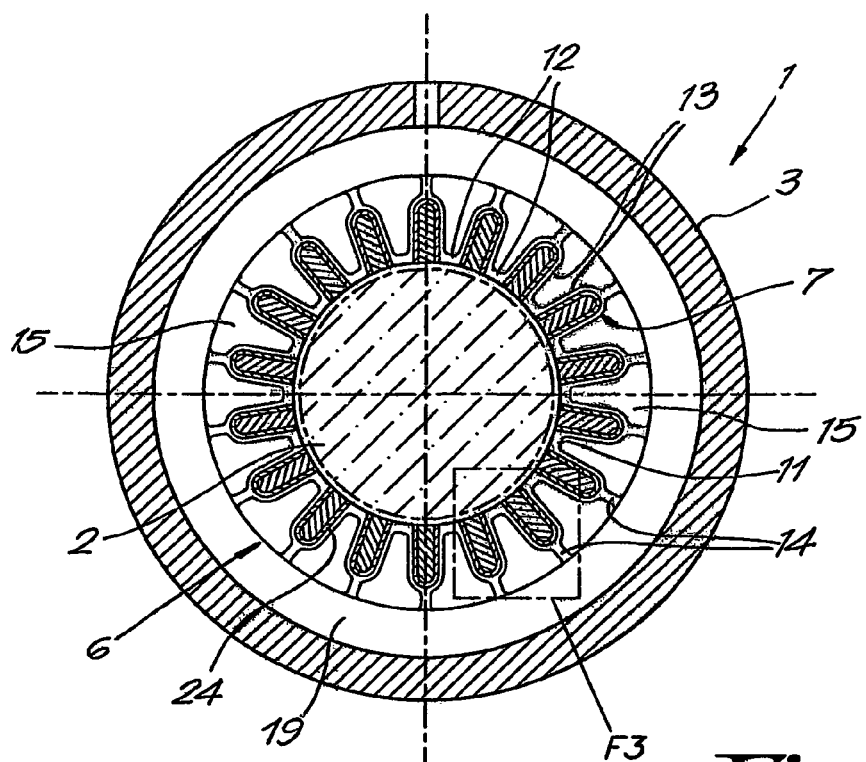
FIG. 2 represents a section according to line II-II in FIG. 1.
Figure 3:
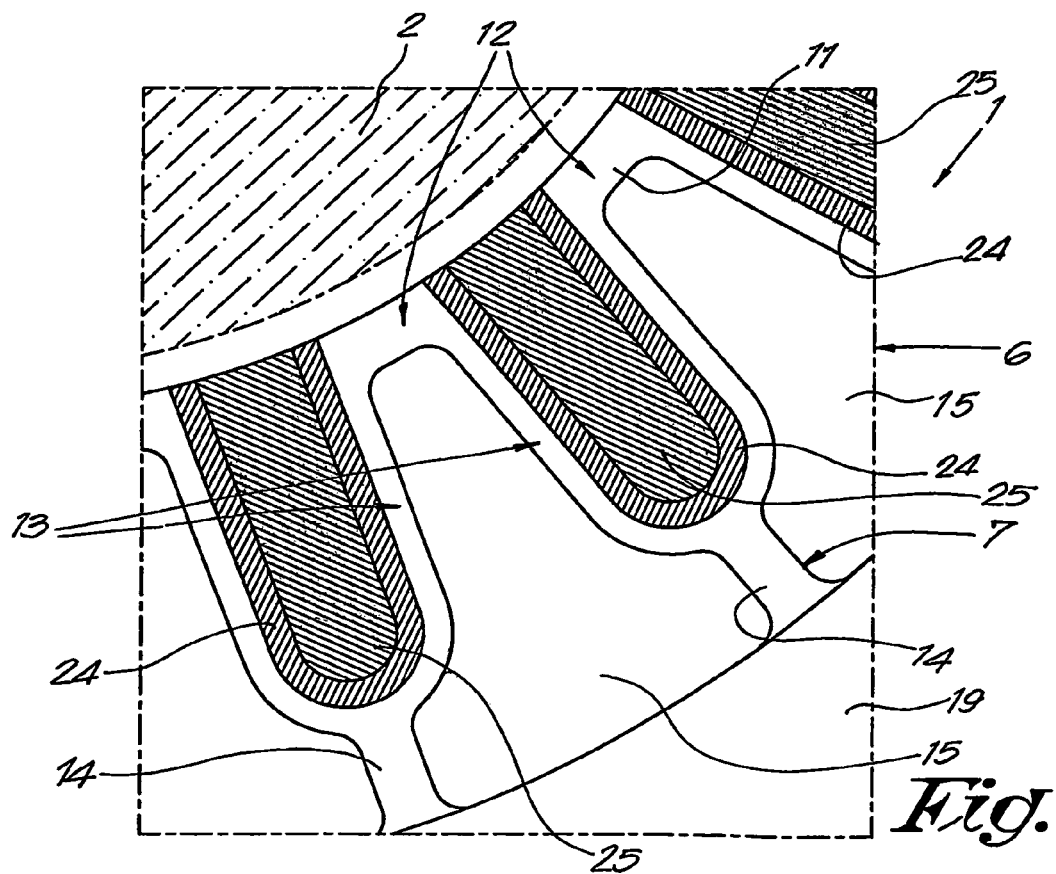
FIG. 3 represents the part indicated by F3 in FIG. 2 to a larger scale.

FIGS. 1 to 5 represent a stator 1 of a motor or generator with an improved cooling according to the invention, whereby the motor or generator is more particularly of the type which is equipped with a rotor 2 with permanent magnets, which rotor 2 is only represented schematically in FIGS. 2 and 3 by means of a dashed line, for clarity's sake.

The stator 1 in this case consists of a tubular housing 3 in which is provided a tubular stator lamination 4 with a predominantly smooth inner wall 5, i.e. with an inner wall 5 without any pronounced grooves or teeth.

Between the stator lamination 4 and the rotor 2 is provided a cooler 6 through which a cooling fluid can be guided and which mainly consists of a cooling element 7 which is connected to an outlet collector 8 on one far end and which is connected to an inlet collector 9 on the other far end.

The cooling element 7 is formed of a double-walled tube with an outer cylindrical tube 10 whose outer diameter corresponds to the inner diameter of the stator lamination 4 and an inner corrugated tube 11 whose corrugations are such that they form radial teeth 12 directed towards the rotor which extend in the axial direction and in between which axially directed grooves 13 are defined.

The above-mentioned teeth 12 and grooves 13 are preferably evenly distributed over the inner perimeter of the cooling element 7.

The outer tube 10 and the inner tube 11 are connected to each other by means of partitions 14 which form passages 15 for a cooling fluid together with the outer and the inner tube 10-11.

In the given example, the cooling element 7 is just as long as the stator lamination 4.

The outlet collector 8 as well as the inlet collector 9 are formed of a ring-shaped element which is formed of a cylindrical outer wall 16 which is provided on one far end of the stator 1 in the housing 3 up against the stator lamination 4; a corrugated inner wall 17 which extends up against and in the prolongation of the corrugated inner tube 11 of the cooling element 7; a sealing wall 18 which connects the above-mentioned outer wall 16 to the inner wall 17; and a side wall 19 which is connected to a far end of the cooling element 7 in the axial direction and which has been partially worked open at the above-mentioned passages 15.

In the above-mentioned outer wall 16 of the outlet collector 8 is provided an opening 20 situated opposite to an outlet opening 21 in the housing 3, whereas in the outer wall 16 of the inlet collector 9 is provided an opening 22 opposite to an inlet opening 23 in the housing 3, which outlet and inlet openings 21-23 are provided for connecting a cooling circuit which is not represented in the figures.

In the given example, the walls of the grooves 13 of the cooler 6 are coated with an electrically insulating film or layer 24, called slot insulation.

Around the teeth 12 of the cooler 6 are provided electric windings extending with axial parts 25 in the above-mentioned grooves 13 and which have bent parts 26 at the far ends of the cooler 6 which are schematically represented by means of a dashed line in FIG. 1 and which are bundled together or tied together in the known manner into what is called a ring-shaped winding head 27 on every above-mentioned far end of the stator 1.

The above-mentioned windings 25-26 can be wound in the same manner, thanks to the toothed design of the cooler 6, as in the case of the known conventional motors and generators which are equipped with a stator lamination with teeth and grooves in which the windings are provided.

In this manner, for the winding of a stator 1 according to the invention, use can be made of installations which could only be used until now for the automatic winding of conventional synchronous and asynchronous motors and generators.

It is clear that, in the case of the invention, providing windings 25-26 in the grooves 13 of the cooler 6 is much simpler than was possible until now with stators of the type having a stator lamination with a grooveless smooth inner wall.

The far ends of the stator 1 are preferably sealed by means of heat-conducting and electrically insulating paste 28, for example a paste on the basis of epoxy or silicones which is cast on the winding head 27 and against the cooler. A tube which fits exactly in the inner diameter of the stator is hereby put in the stator, for example, and the thermally conducting paste is cast up to a height equal to that of the housing. The paste 28 makes contact with the sealing wall 18 of the outlet collector 8, the inlet collector 9 respectively on the one hand, and with the winding head 27 on the far end concerned on the other hand.

The cooler 6 is preferably made of a heat-conducting and electrically insulating material as well.

The use and working of a stator 1 with an improved cooling according to the invention to be applied in a motor or generator is analogous to those of the known embodiments, with this difference that the stator 1, in the case of the invention, is connected to an external cooling circuit via the outlet and inlet openings 21-23 in the housing, as a result of which a cooling fluid flows via the outlet collector 8 through the passages 15 in the cooling element 7 to the inlet collector 9.

As a result, the stator 1 and the windings 25-26 of the stator 1 are cooled directly, and the zones around the rotor 2 and the air in the air gap between the stator 1 and the rotor 2 are cooled indirectly, which has a favourable effect on the temperature, guaranteeing a longer life. In the case of a closed motor, this idea can make the difference between a feasible and a non-feasible embodiment of the motor or of the generator.

It is clear that the inside of the motor or of the generator do not get into contact with the "outside world", as no air has to be sucked in to be blown over the winding heads or between the air gap. The motor housing is sealed on the bearing plates, which are not represented here, and which in this manner seal the motor entirely.

As a result, such a motor or generator according to the invention can be used in dusty and moist circumstances without any problem.

FIGS. 6 to 8 represent a variant of a motor or generator with an improved cooling according to the invention, which is built in an analogous manner as the above-described embodiment, but whereby the cooler 6 is made in another manner.

The cooling element 7 of the cooler 6 is in this case formed of a series of axially directed pipes 29, which are provided at a mutually equal distance from each other and at a mutual distance from the stator lamination 4, and which are held between two ring-shaped flanges 30 which are fixed in the stator lamination 4.

In the flanges 30 are provided passages 31 opposite to the far ends of the above-mentioned pipes 29, whereas in the inner edge of the flanges 30 are provided grooves 32 which are confined by radially inwardly directed teeth 33 situated at equal distances from each other.

The pipes 29 extend in the radial direction up between the grooves 32 and they form passages 15 for a cooling fluid.

The windings 25-26 are provided in the grooves 32 with their axial parts 25.

The cooling element 7 is further formed of a filling material 35 which is thermally conductive and preferably also electrically insulating and which is provided in the space which is confined by the stator lamination 4, the flanges 30, the pipes 29 and the axial parts 25 of the windings 25-26.

In this manner, teeth 12 are formed so to say by the filling material between the axial parts 25 of the windings 25-26.

In the embodiment of FIGS. 6 to 8, the outlet and inlet collectors 8-9 are formed of a similar, ring-shaped element as in the embodiment of FIG. 1, but whereby, in this case, a recess 36 is provided in the inner wall 17 turned towards the rotor 2, in which recess the winding head 27 is cased on the far end concerned of the stator 1 and whereby the space between the winding head 27 and the collector 8-9 concerned is preferably filled with a similar filling material 35, as described above.

The working and use of a motor or generator with an improved cooler according to the last described embodiment is entirely analogous to that of the first embodiment, with this difference that, because of the form of the outlet and inlet collector 8-9, the winding heads 27 concerned are better cooled, since they are enclosed by said collectors 8-9 for a large part, without the cooling medium getting into direct contact with the live guides of the windings however.

Figure 9:
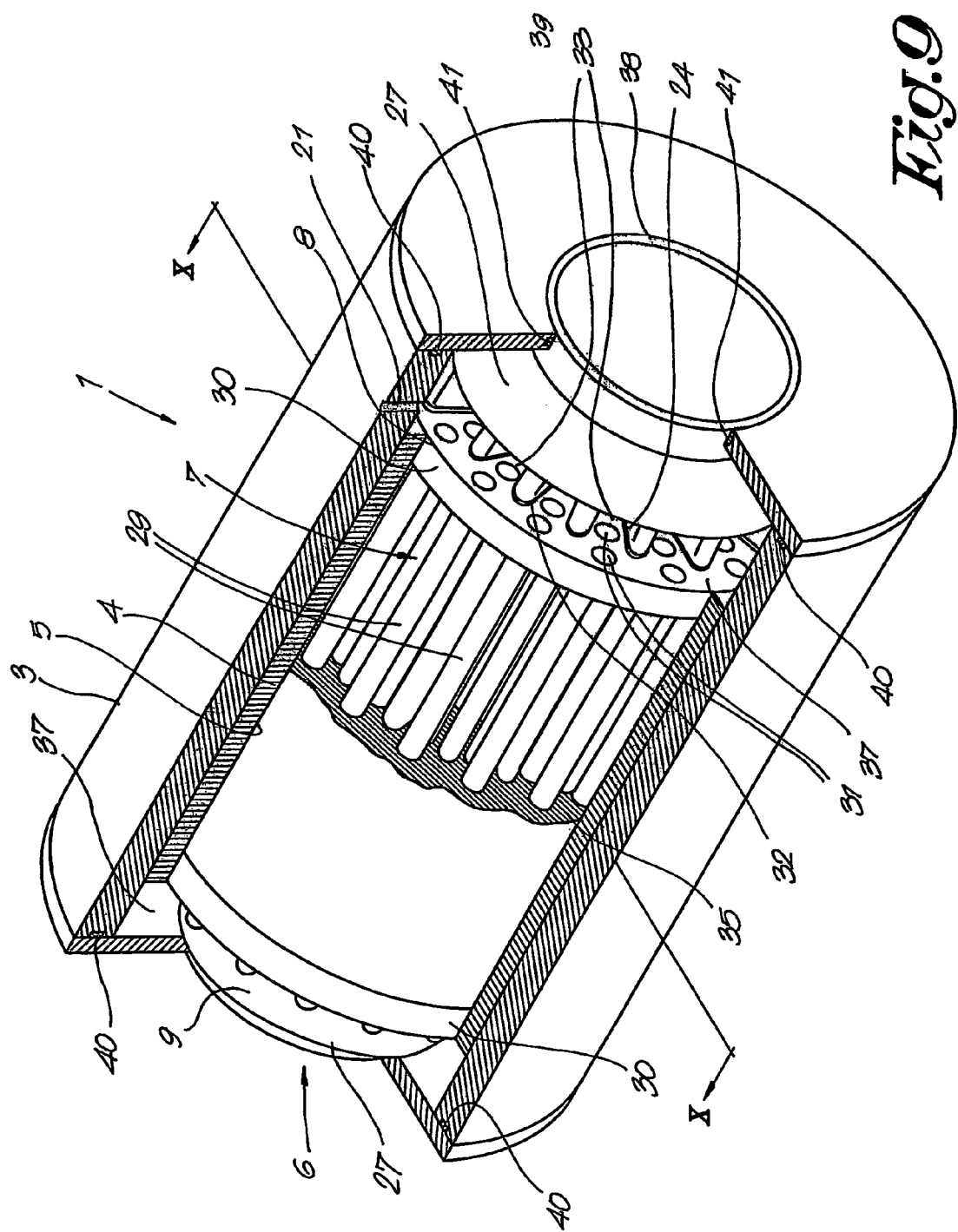
FIG. 9 represents a second variant according to FIG. 1.
Figure 10:
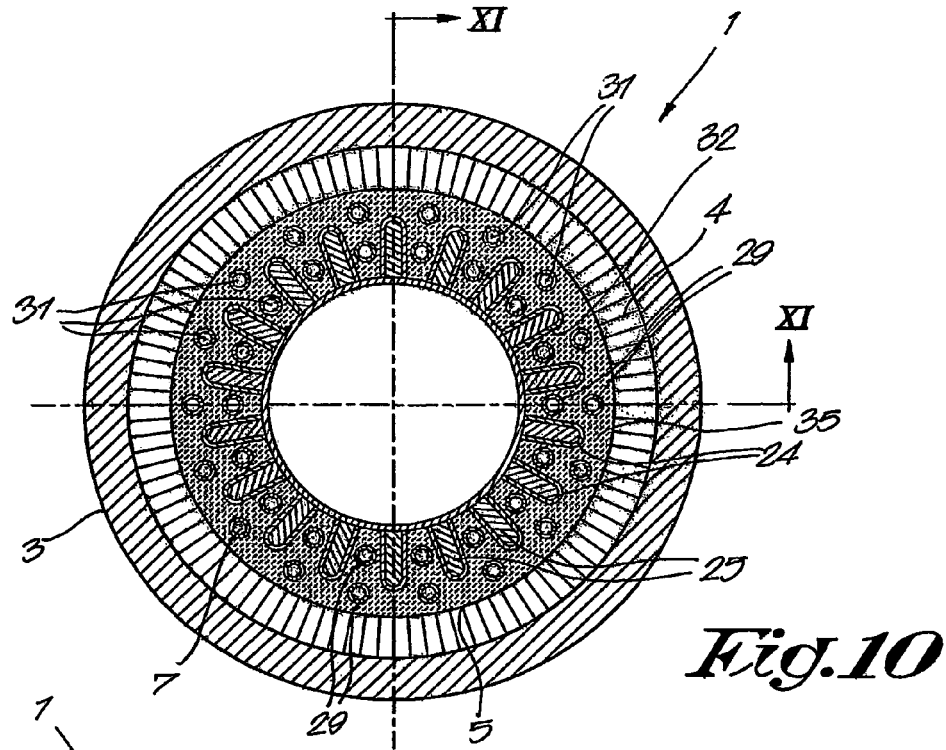
FIG. 10 represents a section according to line X-X in FIG. 9.
Figure 11:
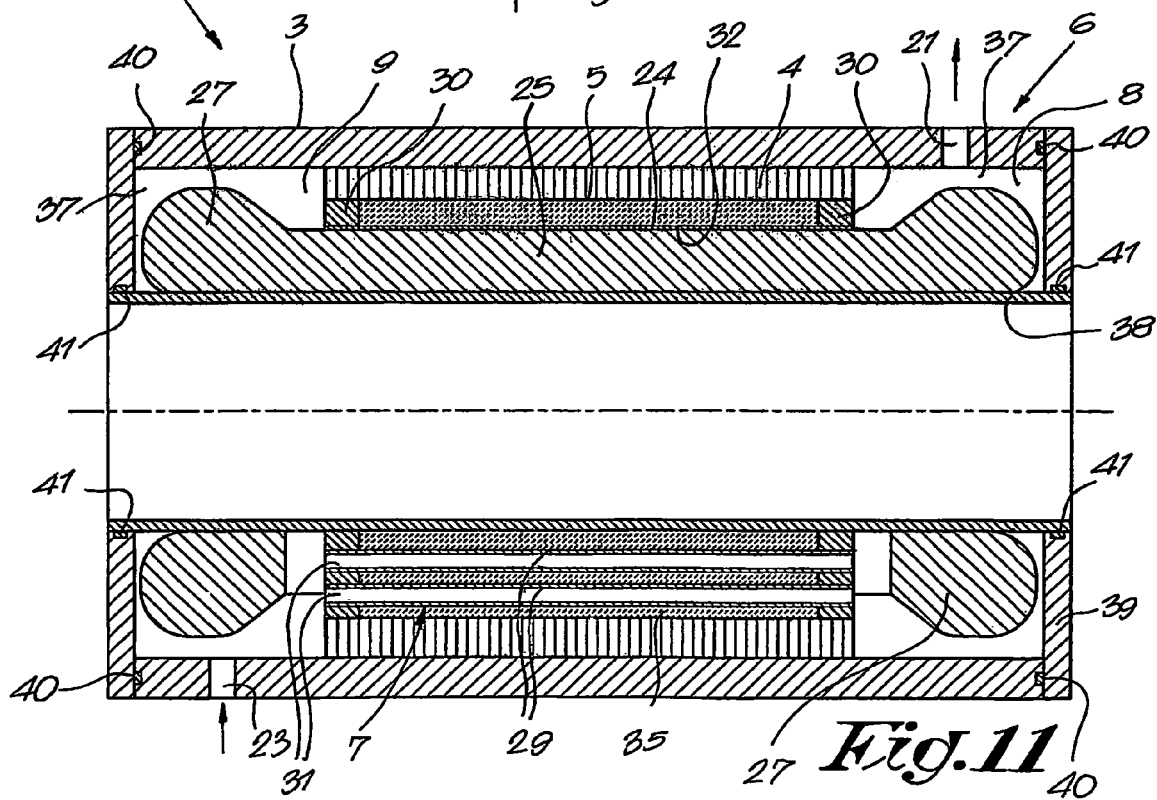
FIG. 11 represents a section according to line XI-XI in FIG. 10.

FIGS. 9 to 11 represent a variant of a motor or generator with an improved cooling according to the invention, with a cooling element 7 which is similar to that of FIG. 6, but whereby two series of axially directed pipes 29 are provided in this case and whereby the pipes 29 of one series are situated at a larger distance from the stator lamination 4 than the pipes 29 of the other series.

The inlet and outlet collectors 8-9 are in this case formed of a ring-shaped chamber 37 which is confined by the housing 3; of the cooling element 7; of an inner tube 38 which has been provided concentrically in the cooling element 7; and of a ring-shaped lid 39 or which is connected to the housing 3 and to the above-mentioned inner tube 38 by means of sealings 40 and 41.

It is clear that the winding heads 27 are in direct contact with the cooling fluid in this case which flows into the collector 9 via the inlet opening 23 and which leaves the outlet collector 8 via the outlet opening 21, such that, in this case, the cooling of the winding heads 27 will be even more efficient than in the case of the above-described variants.

Figure 12:
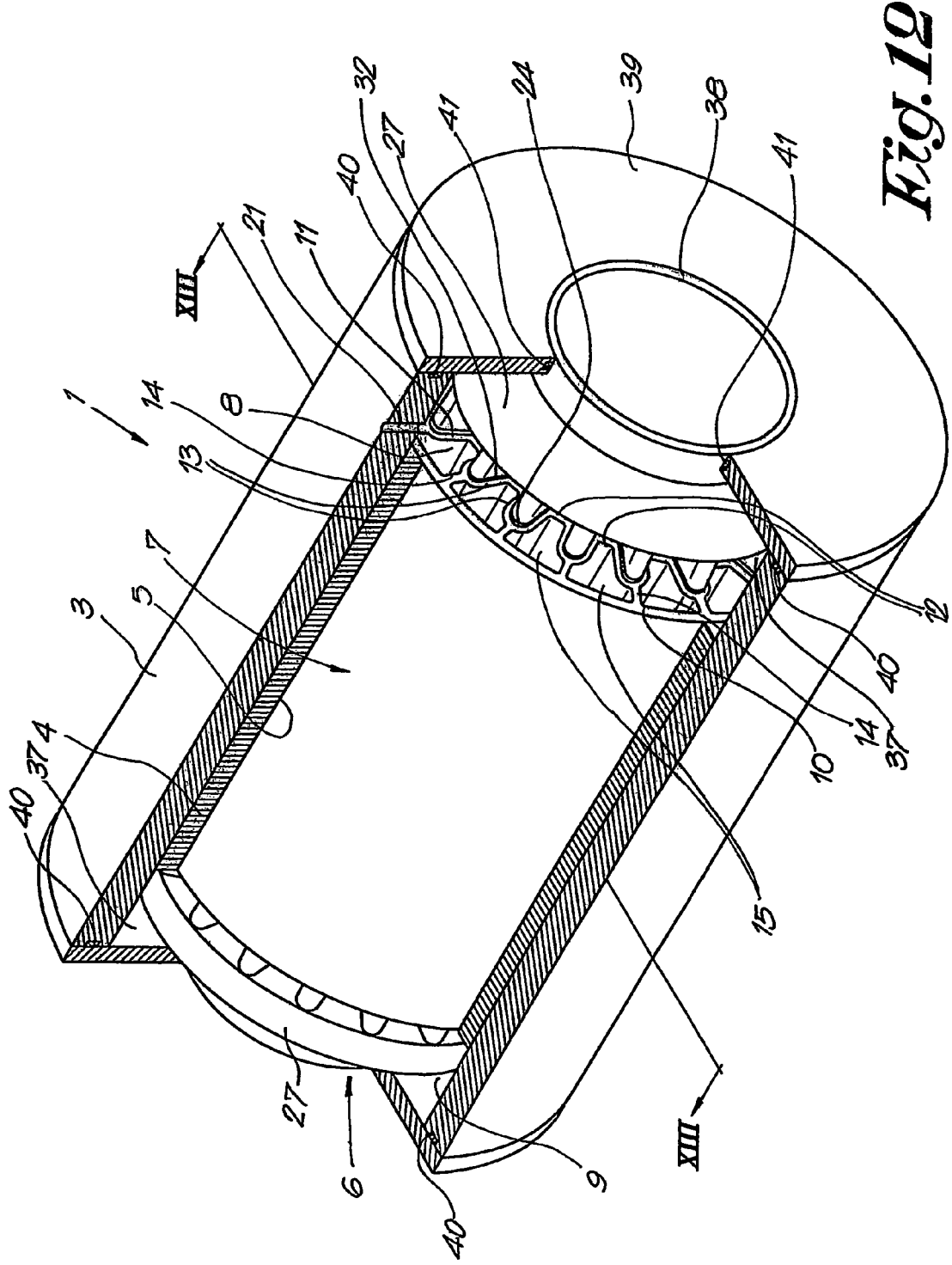
FIG. 12 represents a third and last variant according to FIG. 1.
Figure 13:
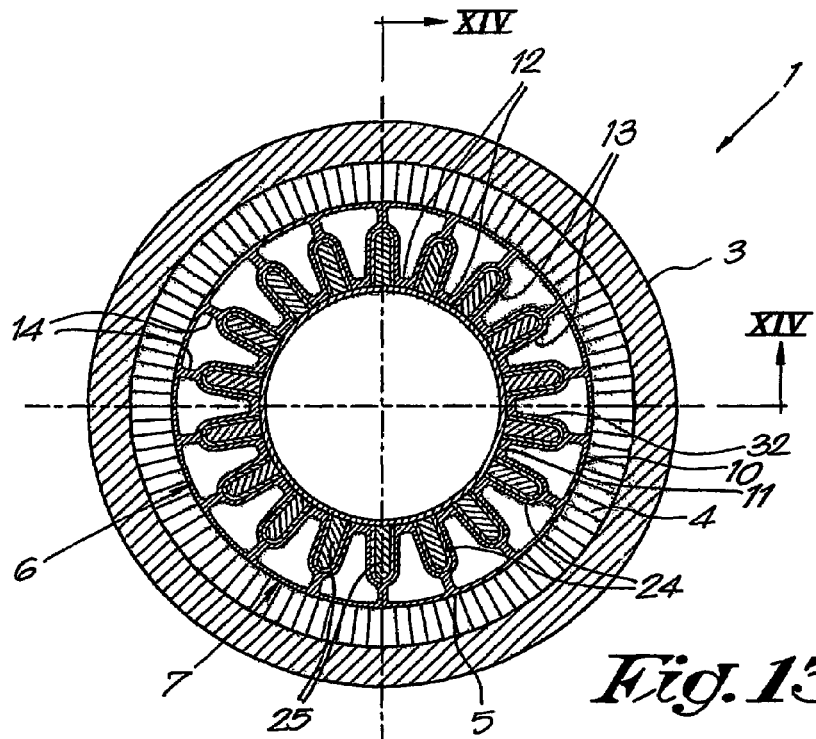
FIG. 13 represents a section according to line XIII-XIII in FIG. 12.
Figure 14:
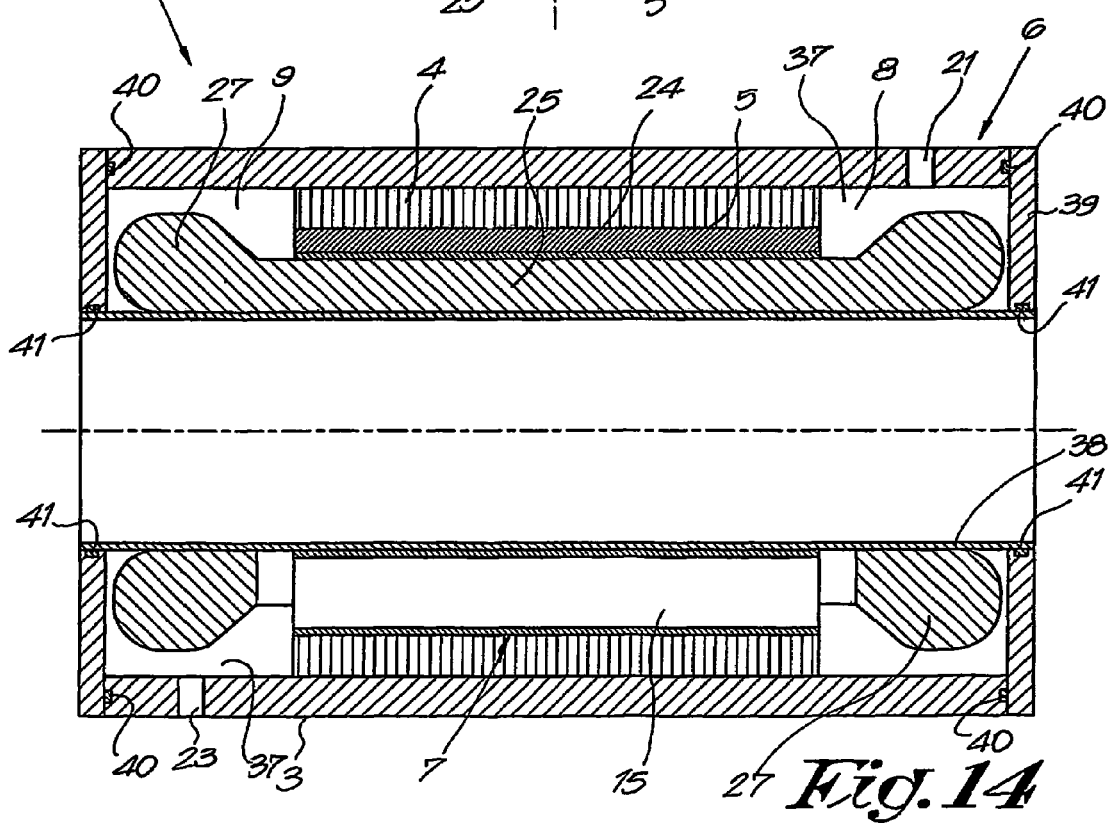
FIG. 14 represents a section according to line XIV-XIV in FIG. 13.

FIGS. 12 to 14 represent another variant of an improved stator 1 which is similar to that of FIG. 9, but whereby the cooling element 7 has been replaced by a cooling element such as that of FIG. 1.

It is clear that also other combinations are possible of a cooling element 7 according to one of the above-described types with outlet and inlet collectors 8-9 in the form of a ring-shaped element or of a ring-shaped chamber 37, as described above.

It is also possible that the cooler 6 is made in one piece, whereby the cooling element 7 and the outlet and inlet collectors 8-9 are integrated in one and the same element.

The present invention is by no means limited to the embodiments described as an example and represented in the accompanying drawings; on the contrary, such a motor or generator with an improved cooling according to the invention can be made in all sorts of shapes and dimensions while still remaining within the scope of the invention.

The invention claimed is:

1. Cooling arrangement for an electric motor or generator that includes a housing, a slotless tubular stator lamination, a rotor with permanent magnets and electric windings which are provided between the stator lamination and the rotor, comprising a cooler upon which said windings are provided, said cooler comprising a mainly cylindrical cooling element provided between the stator lamination and the rotor, said cooling element having one or several axially extending passages defined therein, the passages defining a space for a cooling fluid, the cooling element being provided on an inner wall thereof with teeth directed radially towards the rotor and which extend in an axial direction of the stator and in between which axially directed grooves are defined, such that the cooling element has an external form of a conventional stator lamination with teeth for providing said windings;

wherein the windings are provided on the cooler within the grooves between the teeth and separated from the space inside the passages to prevent contact between the windings and the cooling fluid.

2. Cooling arrangement according to claim 1, wherein the teeth and grooves are evenly distributed about an inner perimeter of the cooler.

3. Cooling arrangement according to claim 1, wherein the windings are provided around said teeth and wherein the windings have axial pans which extend in the grooves and bent parts which are bundled together into a winding head disposed on both far ends of the stator.

4. Cooling arrangement according to claim 1, wherein the passages are connected to an outlet collector on one far end of the stator and to an inlet collector on the other far end of the stator, respectively.

5. Cooling arrangement according to claim 1, wherein the cooling demerit comprises a double-walled tube including an outer tube and an inner tube defining the inner wall.

6. Cooling arrangement according to claim 5, wherein the outer tube is a cylindrical tube whose outer diameter corresponds to the inner diameter of the stator lamination, and the inner tube is a corrugated tube with axially directed teeth and grooves, said outer and the inner tubes connected to each other by means of partitions which, together with the outer and the inner tubes, define the passages for the cooling fluid.

7. Cooling arrangement according to claim 1, wherein the cooling element comprises axially directed pipes which form said passages and which are provided at mutually equal distances from each other between the stator lamination and the rotor and are cased at least with their far ends in two ring-shaped flanges which are fixed in the stator lamination.

8. Cooling arrangement according to claim 7, wherein at least a part of the pipes is situated partially between the axial parts of the windings.

9. Cooling arrangement according to claim 7, wherein ring-shaped flanges are provided with teeth which are radially directed towards the rotor, in between which said windings are provided.

10. Cooling arrangement according to claim 9, wherein the space between the pipes and the axial parts of the windings is at least partially filled with a thermally conductive and electrically insulating filling material.

11. Cooling arrangement according to claim 4, wherein the outlet and inlet collectors are each formed of a ring-shaped element which confines a ring-shaped chamber, said ring-shaped element being connected to a side wall against a far end of the cooling element and wherein this side wall has been worked open at the said passages of the cooling element.

12. Cooling arrangement according to claim 11, wherein each ring-shaped element is connected to the housing with an outer wall and wherein at least one opening is provided in this outer wall, which opening is situated opposite to an outlet opening and inlet opening, respectively, in the housing.

13. Cooling arrangement according to claim 12, wherein, in the ring-shaped element in the wall directed towards the rotor there is provided a recess in which the winding head is cased on the respective far end of the stator.

14. Cooling arrangement according to claim 5, wherein the outlet and inlet collectors comprise a ring-shaped chamber which is confined by the housing; said cooling element; an inner tube which is provided concentrically in the cooling element; and a ring-shaped lid which is connected to the housing and to said inner tube.

15. Cooling arrangement according to claim 14, wherein in the housing, at the height of the outlet and inlet collectors, there is provided at least one outlet or inlet opening, respectively.

16. Cooling arrangement according to claim 1, wherein the cooler comprises a thermally conductive and electrically insulating material.

* * * * *